(No Model.)
F. S. LOOCKERMAN.
RIPPING ATTACHMENT FOR SCISSORS.
No. 293,182. Patented Feb. 5, 1884.
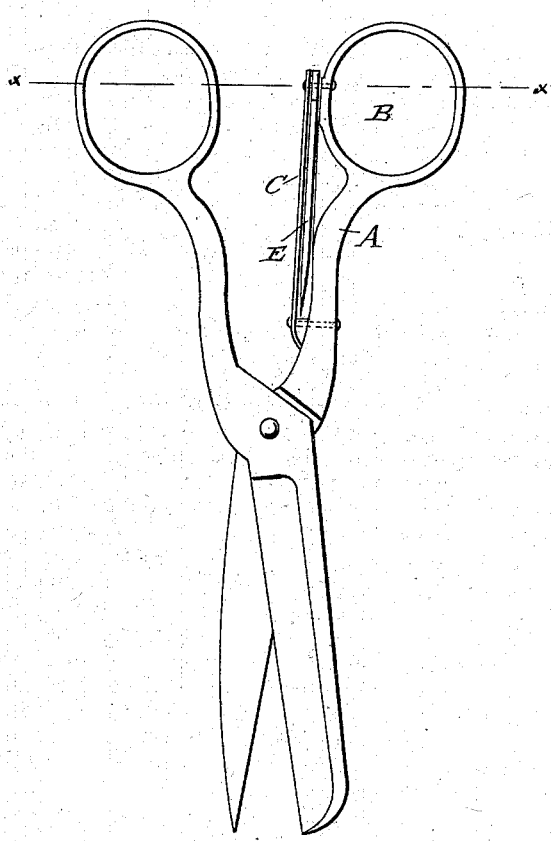
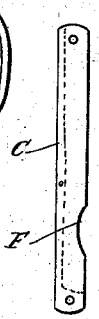
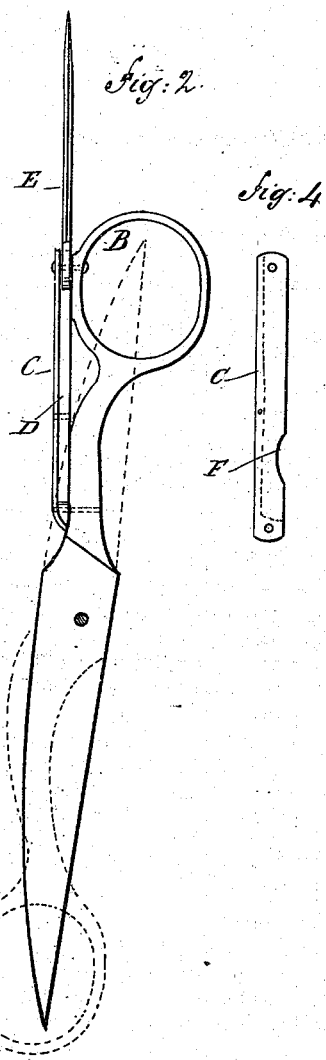
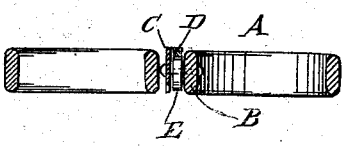
WITNESSES:
INVENTOR:
F. S. Loockerman
BY
ATTORNEYS.

UNITED STATES PATENT OFFICE.

FRANCIS S. LOOCKERMAN, OF MANOKIN, MARYLAND.

RIPPING ATTACHMENT FOR SCISSORS.

SPECIFICATION forming part of Letters Patent No. 293,182, dated February 5, 1884.

Application filed October 31, 1883. (No model.)

*To all whom it may concern:*

Be it known that I, FRANCIS S. LOOCKERMAN, of Manokin, Somerset county, Maryland, have invented a new and Improved Ripping Attachment for Scissors, of which the following is a full, clear, and exact description.

The object of my invention is to provide a new and improved attachment for scissors, to facilitate the ripping of seams, &c.

The invention consists in providing one of the handles of an ordinary pair of scissors with a casing on its inner side, within which casing is pivoted a ripping-blade. A spring may be used or not, as may be desired.

Reference is to be had to the accompanying drawings, forming part of this specification, in which similar letters of reference indicate corresponding parts in all the figures.

Figure 1 is a longitudinal elevation of a pair of scissors provided with my improved ripping attachment, the scissors and the attachment being closed. Fig. 2 is a like view, showing the scissors and the attachment opened. Fig. 3 is a sectional plan view of the same on the line $x\ x$, Fig. 1. Fig. 4 is a side view of the casing of the ripping-blade.

To the inner edge of one of the handles A of a pair of scissors, and to the handle-loop B, a knife-casing, C, is fastened by rivets, in which casing a knife-spring, D, is held. In the lower end of the casing a knife-blade, E, is pivoted, which can be folded within the casing, which blade is held in the desired position by the spring D. The edge of the casing C is provided with a notch, F, to permit passing the finger-nail into the notch of the blade to open the blade. If the blade E is to be used for ripping seams, &c., the scissors are opened, as shown in Fig. 2, so that the cutting-edges of the blades will be as far apart as possible, and the knife E is swung out of the casing C, so as to project from the end of the handle, as shown. The attachment does not interfere with the use of the scissors, as it is very compact when the knife E is folded within the casing.

I am aware that it is not new to provide the blades of scissors, at their forward ends, with additional blades for ripping; and also that a pair of spring-handles riveted together at their outer ends has been provided with a casing and ripping-blade between said handles; and I do not claim such as my invention.

Having thus described my invention, I claim as new and desire to secure by Letters Patent—

An improved ripping attachment for ordinary scissors, consisting of a casing secured to the under side of one of the handles, and a ripping-blade pivoted to and adapted to fold within said casing, substantially as set forth.

FRANCIS S. LOOCKERMAN.

Witnesses:
JOHN S. SUDLER,
G. W. MADDOX.